June 22, 1926.
C. HARGREAVES
1,590,162
MACHINE FOR PEELING, CORING, AND SIZING PINEAPPLES
Filed Dec. 27, 1923    2 Sheets-Sheet 1
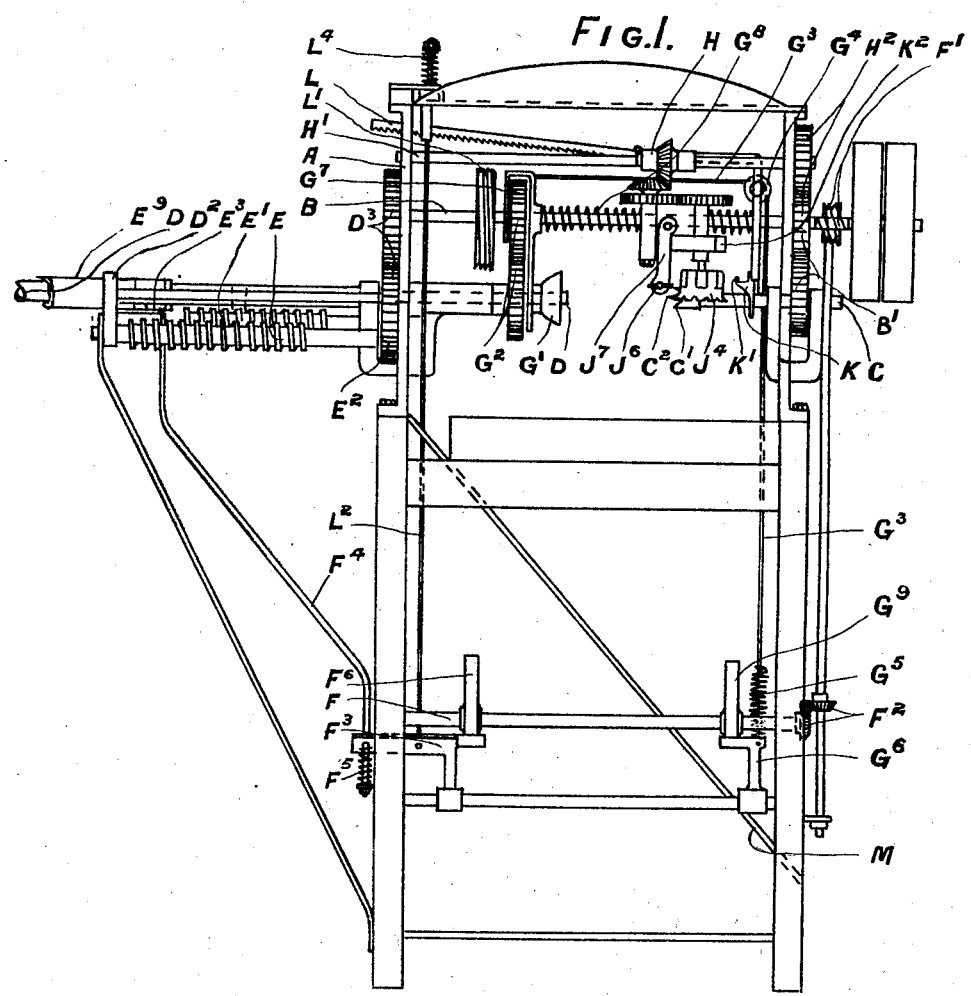
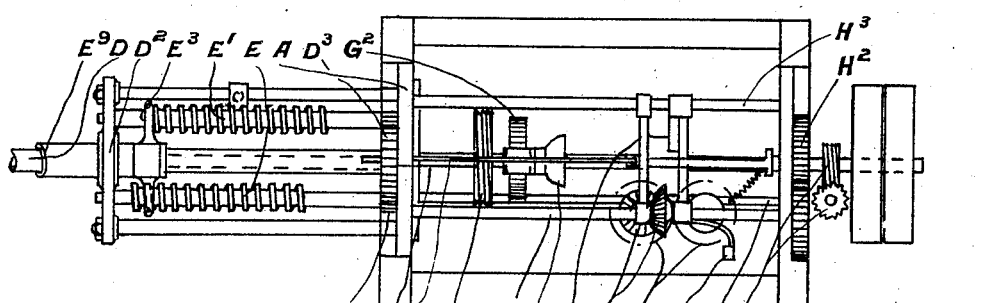
Inventor
C. Hargreaves
By Marks & Clerk
Attys.

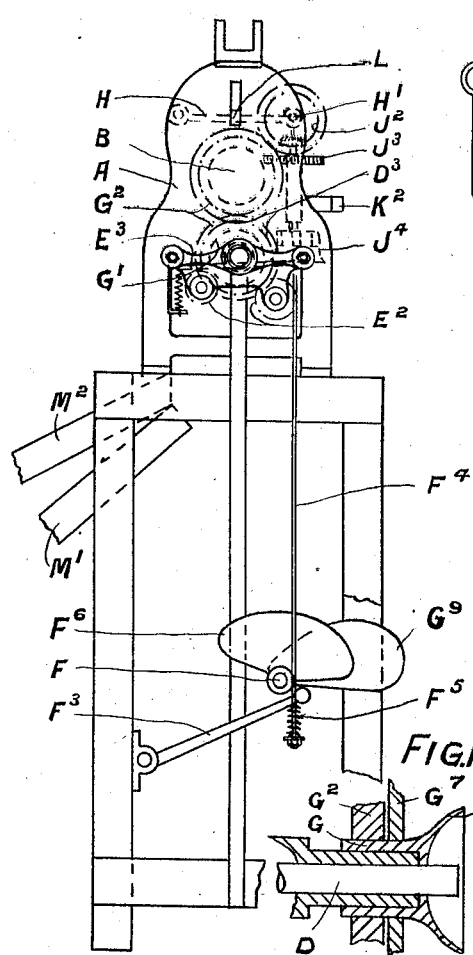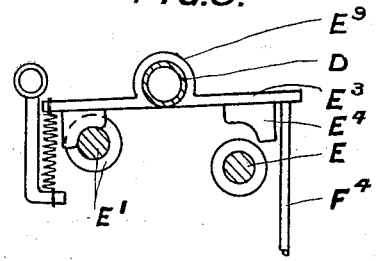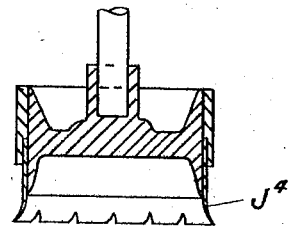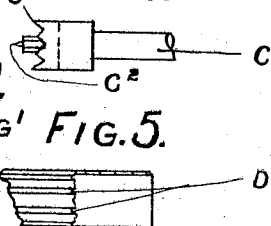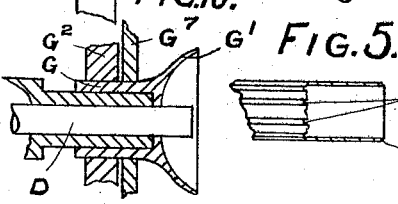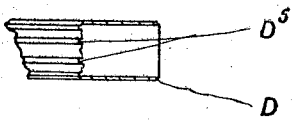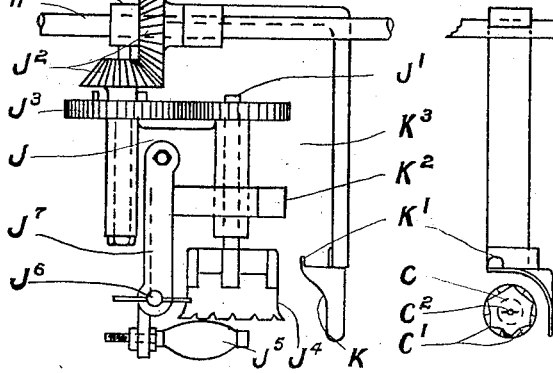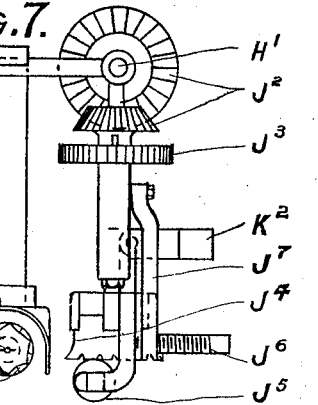

Patented June 22, 1926.

1,590,162

UNITED STATES PATENT OFFICE.

CHARLES HARGREAVES, OF MANLY, QUEENSLAND, AUSTRALIA.

MACHINE FOR PEELING, CORING, AND SIZING PINEAPPLES.

Application filed December 27, 1923, Serial No. 683,084, and in Australia July 20, 1923.

This invention relates to pineapple preparing machines, the object being to produce a machine that will peel, core, and size pineapples at the one operation in an expeditious manner.

According to my invention the pineapple is rotatably carried by the end of one shaft and a centre cup and hollow shaft, which removes the core. A revolving cutter removes the skin, the depth of the cut being regulated by a gauge. A sizing knife then cuts the pine to the desired size.

In order that my invention may be better understood I will now describe it more fully with the aid of the accompanying drawings in which Fig. 1 is a front elevation.
Fig. 2 is a plan thereof.
Fig. 3 is an end elevation.
Figs. 4 to 10 are detail views.

In carrying out my invention I provide a light but strong frame A. A main shaft B driven from any source of power supply runs in bearings carried in the frame A. From this a "centre" shaft C, which carries one end of the pineapple, is driven by suitable gearing, such as spur wheels $B^1$. This "centre" shaft C, which runs in bearings in the frame A, is formed with or has a centre and peripheral points $C^2$ $C^1$ on the end. In alignment with this "centre" shaft C is a coring shaft D running in bearings $D^2$ on the opposite side of the frame A. This coring shaft D, which is driven from the main shaft B by suitable gearing, such as the spur wheels $D^3$, is hollow and has grooves or flutings $D^5$ or other formations on the outside so that the pine, as it is cored, is caused to rotate with the shaft. Longitudinal movement is imparted to the coring shaft D by means of a rocking crosshead $E^3$ carried thereby. This crosshead $E^3$, which has a long sleeve $E^9$ slidably carried on the shaft D so as to prevent twisting, is caused to engage with either of two worm shafts E $E^1$ driven from the main shaft B in opposite directions by the spur wheel $E^2$, so that a forward movement is imparted to the screw E and a return movement is given to the screw $E^1$. A shaft F, running in bearings in the lower or other convenient part of the machine, is driven from the main shaft B, as by worm and worm wheel $F^1$, bevel wheels $F^2$, or otherwise. This shaft F has a cam $F^2$ secured thereon, which is arranged to operate a lever $F^3$, which, in turn, operates a vertical rod $F^4$ attached to the rocking crosshead $E^3$, and which controls the movement thereof. A spring buffer $F^5$ is provided on the rod $F^4$.

Slidably and rotatably carried on the bearing $D^2$, in which the coring shaft D rotates, is a sleeve G having a centring cup $G^1$ at the end. This sleeve G and centring cup $G^1$ are rotated by the main shaft B by suitable gearing, such as the spur wheels $G^2$, and longitudinal movement is imparted thereto by a cord or chain $G^3$ attached thereto, and which, after passing over a pulley $G^4$, is attached to a spring $G^5$, which, in turn, is secured to a lever $G^6$ pivoted on the frame A. The bracket $G^7$ keeps the respective parts in place. The lever $G^6$ is operated by a cam H on the shaft F running in the lower part of the machine. A spring $G^7$ suitably arranged forces the centring cup $G^1$ back to release the pine after it has been pared, cored, and sized.

The frame H is slidably carried, such as by the shaft $H^1$ (driven from the main shaft B by spur wheels $H^2$) and a tie rod $H^3$.

Pivotally and dependably carried by the slidable frame H is a bracket J which carries a spindle $J^1$ driven from the shaft $H^1$ by the bevel wheels $J^2$, and spur wheels $J^3$. Any free wheel arrangement may be provided, if desired, by which the horizontal bevel wheel $J^2$ drives the first spur wheel $J^3$. The spindle $J^1$ carries a paring knife $J^4$, as clearly shown in Fig. 8. On the bracket J is a roller gauge $J^5$ hinged thereto, provided with a screw $J^6$ screwed through the arm $J^7$ so that the thickness of the skin pared off can be adjusted as desired.

Suspended from the slidable frame H is the sizing knife K, consisting of a segmental blade having a forward cutting edge and a vertical cutter $K^1$. The bracket J is controlled by the arm $K^2$ and is held in its normal position by the spring $K^3$.

The frame H is moved forward by means of a rack L, which is brought into engagement at the proper moment with a worm $L^1$ on the main shaft B by means of a rod $L^2$ connected to a lever $L^3$ actuated by the cam $F^2$ on the shaft F at the lower portion of the machine. A spring $L^4$ raises the rack L out of engagement from the worm $L^1$ at the end of the stroke and another spring $L^5$ suitably placed forces the frame H carrying the paring and sizing knives J⁴ K back to its normal position.

The parings fall into a shoot M, the sizings fall into a shoot M¹, and the sized pineapples fall into the shoot M², each shoot being suitably placed so as to catch and direct the materials where desired.

The constructional details of machines constructed according to my invention may be varied as found necessary so long as the essential features are retained.

The operation of my invention is as follows: The machine having been set in motion the pineapple is placed in position with one end against the "centre" C² and the other end in the cup G¹. As the cam G⁹ comes into action, the cup G¹ is moved tight against the pineapple holding it in position. Any surplus strain caused by the action of the cam G⁹ is taken up by the spring G⁵. At the proper moment the cam F² operates on the lever F³ and the tooth E⁴ of the rocking crosshead E³ is caused to engage the screw E and the coring shaft D forced forward against and into the pineapple, thus removing the core thereof. The core and body of the pineapple rotates with the shafts because of the points C² C¹ on the "centre" shaft C and the fluting D⁵ on the coring shaft D. The rack L is then caused to engage the worm L¹ and the sliding frame H, thereby moved forward. As it does so, the paring knife J⁴, which rotates at the required speed, and the sizer K are brought into operation, taking off the skin and excess pine respectively.

The various parts are brought back to normal at the end of the operation, when the levers E⁶ are released by the springs and screw E¹.

Having now particularly described and ascertained the nature of my said invention and in what manner the same is to be performed, I declare that what I claim is:—

1. In a machine for preparing pineapples, a frame, a main shaft journalled therein, a centering shaft also mounted in the frame and operably connected with the main shaft, points on said shaft, a coring shaft rotatably mounted in the frame opposite the centering shaft and operably connected with the main shaft, means for reciprocating the coring shaft in opposite directions, manually operable means for controlling the direction of reciprocation of the coring shaft, a centering cup mounted on the forward end of the coring shaft, means for reciprocating the cup, and means for controlling the reciprocation of the cup, substantially as and for the purposes set forth.

2. In a machine for preparing pineapples and the like, a frame, a main shaft journalled therein, a centering shaft also mounted in the frame and operably connected with the frame, points on the shaft, a coring shaft rotatably mounted within the frame opposite the centering shaft, screws operably connected with the main shaft and rotatable in opposite directions, a rocking crosshead mounted on the coring shaft, teeth on the respective ends of the crosshead for engagement with the screws, means for controlling the operation of the crosshead to consequently regulate the reciprocation of the coring shaft, a centering cup mounted on the forward end of the coring shaft, and means for operating the cup, substantially as and for the purposes set forth.

3. In a machine for preparing pineapples, a sliding frame, a rack attached to said frame, a worm driven from a source of power supply, means for moving said rack into and out of gear with said worm, as and for the purposes herein set forth.

4. In a machine for preparing pineapples, a sliding frame, a bracket pivotally connected to said frame, a spindle running in said bracket and driven from the main shaft of said machine, a paring knife on said spindle, a gauge carried by said bracket, as and for the purposes herein set forth.

5. In a machine for preparing pineapples as set forth in claim 4, a sizer carried by the sliding frame, substantially as and for the purposes set forth.

6. In a machine for preparing pineapples, a main frame, centering, coring, paring and sizing mechanisms mounted therein, means for actuating said mechanisms including a main shaft operably connected with the mechanisms, a secondary shaft operated with the main shaft, cams carried by the secondary shaft, means actuated by the cams for controlling the actuation of the mechanisms by the main shaft, and means associated with the above mentioned means for returning the mechanisms to their original positions at suitable intervals so that the cycle of operation of the mechanisms may be repeated, substantially as and for the purposes set forth.

In testimony whereof I affix my signature.

CHARLES HARGREAVES.